Feb. 9, 1954   C. H. SPARKLIN   2,668,611
CENTRIFUGALLY RELEASED CLUTCH
Filed Oct. 27, 1948
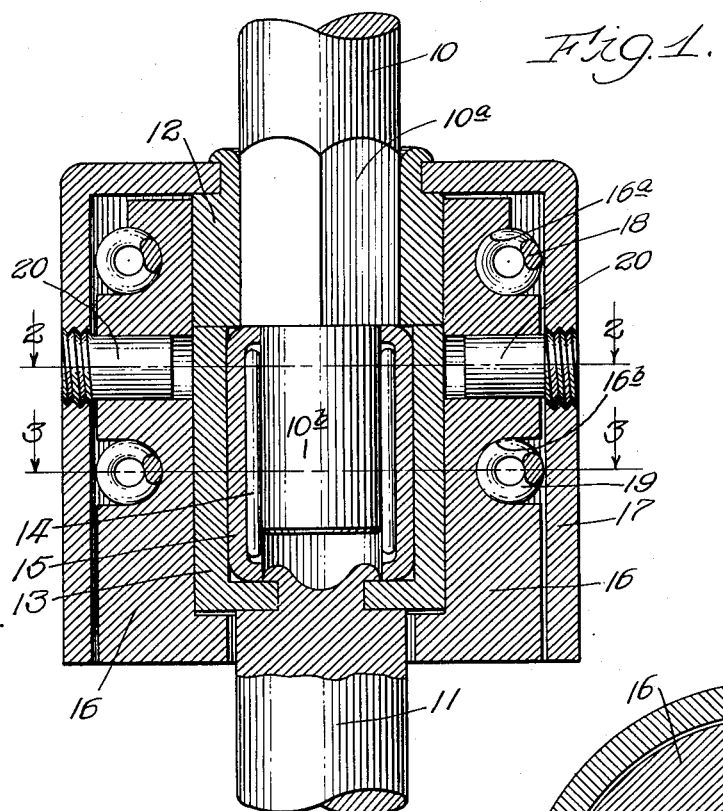
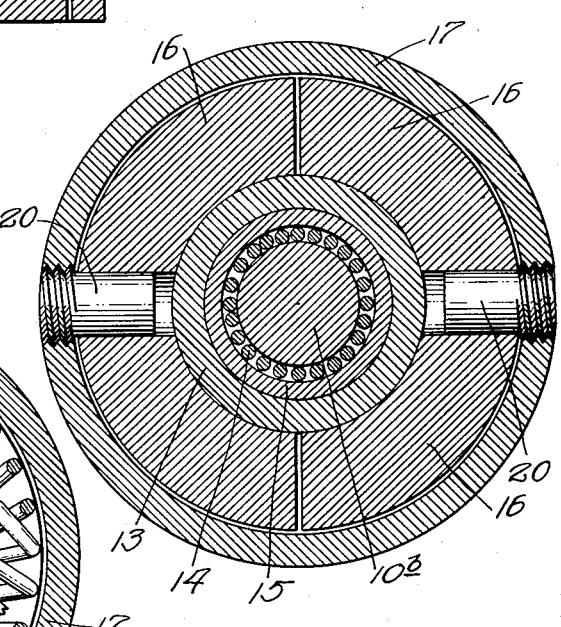
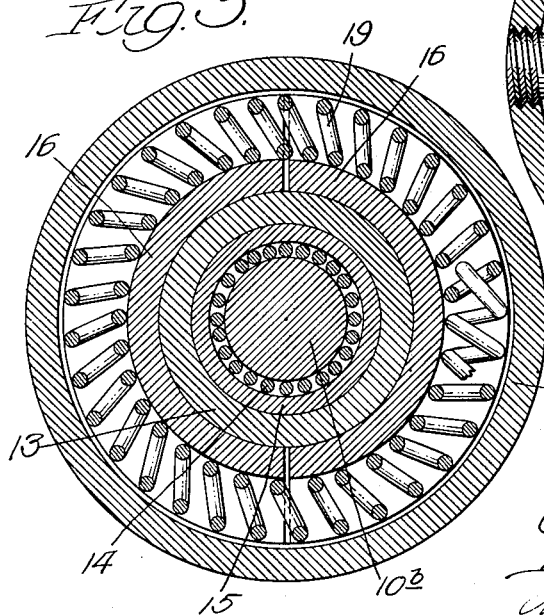
Inventor:
Charles H. Sparklin,
By Cotton, Schroeder,
Merriam & Hogan, Attys.

Patented Feb. 9, 1954

2,668,611

UNITED STATES PATENT OFFICE 2,668,611

CENTRIFUGALLY RELEASED CLUTCH

Charles H. Sparklin, Chicago, Ill., assignor to Birtman Electric Company, a corporation of Illinois Application October 27, 1948, Serial No. 56,801

3 Claims. (Cl. 192—104)

This relates to a friction clutch, and relates particularly to such a clutch adapted to bind together a driving rotatable member and a driven rotatable member for rotation as a unit, but adapted to disengage the rotatable members at a predetermined speed of rotation.

In many structures where there are provided driving rotatable members and driven rotatable members, it is necessary to provide means for disengaging these members at or above a predetermined speed of rotation and for disengaging the rotatable members for rotation of the unit at speeds below said predetermined speed. The present invention is concerned with a friction clutch for accomplishing these results. The friction clutch of this invention provides friction means for binding the rotatable members together. This friction means is preferably in the form of at least one friction member movable away from at least one of the rotatable members and releases said rotatable member after a predetermined speed of rotation has been reached. The friction member is urged outwardly by centrifugal forces acting thereon and is urged inwardly in binding relationship with at least one friction member being a spring means or the like. The urging means may be easily adjusted so that it will hold the friction member in binding relationship until a centrifugal force equivalent to a predetermined speed has been reached. The friction clutch of this invention is an efficient structure that can be arranged to operate at almost any predetermined speed, yet is simple and inexpensive in construction. It successfully solves the problem of providing a simple arrangement that can be adjusted to operate at any desired predetermined speed and that will give trouble-free operation throughout the life of the clutch.

The invention will be described as related to the embodiment shown in the accompanying drawings. Of the drawings: Fig. 1 is a sectional elevation taken longitudinally through a friction clutch; Fig. 2 is a transverse section taken substantially along the line 2—2 of Fig. 1; and Fig. 3 is a transverse section taken substantially along line 3—3 of Fig. 1.

The friction clutch shown in the accompanying drawings comprises a driving rotatable member 10, here shown as a first shaft, and a driven rotatable member 11, here shown as a second shaft. The axes of rotation of the two rotatable members are substantially aligned and the two members are closely adjacent each other. The driving rotatable member 10 is provided with a square end 10a held in a collar 12. The adjacent end of the driven rotatable member 11 is provided with a hollow substantially cylindrical collar 13 attached thereto. The extreme end of the driving rotatable member 10 beyond the collar 12 has a reduced portion 10b of substantially circular cross-section arranged within the hollow cylindrical collar 13. There is provided an anti-friction bearing in the form of needle bearings 14 arranged in a housing 15 and located between the reduced portion 10b and the hollow cylindrical collar 13.

The collar 12 on the driving rotatable member 10 and the hollow cylindrical collar 13 on the end of the driven rotatable member 11 are each of substantially circular cross section and have their outer surfaces substantially aligned, as shown in Fig. 1. In order to bind the collars 12 and 13 and thus the rotatable members 10 and 11 for rotation as a unit, there is provided a pair of friction members 16 arranged around these outer surfaces. These friction members 16 are located within a hollow substantially cylindrical casing 17 attached to the driving rotatable member 10 and extending around the friction members 16. The friction members are fitted loosely therein so that they may move outwardly when subjected to centrifugal force equivalent to a predetermined speed. Each friction member 16 has substantially semi-circular inner and outer surfaces, as shown in Fig. 2. The two friction members 16 are urged against the outer surfaces of the collars 12 and 13 by a pair of coil springs 18 and 19. These coil springs are arranged substantially parallel to each other and in spaced apart relationship. One coil spring 18 is located opposite the outer surfaces of the collar 12, while the other coil spring 19 is located opposite the outer surface of the collar 13. The coil spring 18 is located in a groove 16a, while the coil spring 19 is located in a second groove 16b in the friction members 16. As shown in Fig. 3 with respect to spring 19, each of the springs 18 and 19 have their ends interlocked so as to be continuous around the friction members 16.

The tension of the springs 18 and 19 is so regulated that when the rotatable members are not rotating, the friction members 16 are held against the outer surfaces of the collars 12 and 13. When the driving rotatable member 10 is rotated, the driven rotatable member 11 is also rotated due to the binding action of the friction members 16. Thus the two rotatable members rotate as a unit until a predetermined maximum speed has been reached. This predetermined maximum speed, which is dependent on the tension of the springs 18 and 19, may be controlled by controlling the tension of the springs as related to the weight of the friction members 16. As soon as this predetermined speed is exceeded, centrifugal forces acting on the friction members 16 cause these friction members to move away from the surfaces of the collars 12 and 13 and against the inner surface of the casing 17. This outward movement of the friction members releases the driven rotatable member 11 so that this member stops rotating. The driving rotatable member 10, the casing 17 and the friction members 16 continue to rotate, however, while the reduced portion 10b rotates against the anti-friction bearings within the interior of the collar 13. As soon as the speed of rotation of the driving rotatable member falls below the predetermined speed of rotation, the springs 18 and 19 force the friction members 16 against the collars 12 and 13 so that the two rotatable members are again bound together for rotation as a unit.

In order to permit radial movement of the friction members 16, there are provided a pair of studs 20 located diametrically opposite each other and held in the casing 17 in sliding engagement with openings provided in the friction members 16. The friction members slide freely on the studs 20 during the radial movement of the friction members.

In the preferred construction, the area of the collar 13 that is contacted by the friction members 16 is considerably larger than the corresponding area of the collar 12. This arrangement, which is illustrated in Fig. 1, is important as it aids in reducing slippage between the friction members and the collar 13 when the friction members first contact the collar 13.

It is believed obvious that the friction clutch of this invention can be used on many installations where a speed responsive clutch is desired. One such installation is shown in my copending application Serial No. 56,802, filed October 27, 1948, and now Patent No. 2,564,734, issued August 21, 1951, wherein a vacuum cleaner is provided with an agitating means for a dust separating member with this agitating means being operable only when the vacuum cleaner motor is rotating at a speed less than a predetermined speed.

Having described my invention as related to the embodiment shown in the accompanying drawings, it is my intention that the invention be not limited by any of the details of description unless otherwise specified, but rather be construed broadly within its spirit and scope as set out in the accompanying claims.

I claim:

1. A friction clutch comprising a driving rotatable member having a substantially circular end section, a driven rotatable member aligned with the first member and having a substantially circular end section whose surface is substantially coextensive with the surface of the end section of the first rotatable member, said driving rotatable member having an extreme end portion extending into a cavity in the adjacent end of the driven rotatable member and rotatable therein, an anti-friction bearing between said extreme end portion and the inner wall of said cavity, a pair of friction members on opposite sides of said coextensive surfaces arranged to contact said surfaces and bind the rotatable members together for rotation as a unit, spring means extending around in contact with said friction members and urging the friction members in said contact, said friction members being movable away from said surfaces against said spring means under a centrifugal force equivalent to a predetermined speed of rotation, and a limiting means attached to said driving rotatable member and extending around the longitudinal surfaces of said friction members, said limiting means being normally spaced from the friction members for limiting the outward movement of the friction members.

2. The friction clutch of claim 1 wherein the surface of the driving rotatable member contacted by said friction members has a smaller area than the corresponding surface of said driven rotatable member, and a pair of said spring means are provided around the friction members, one of said spring means being located opposite said surface of the driving rotatable member, and the other spring means being located opposite said surface of the driven rotatable member.

3. A rotatable friction clutch comprising a driving shaft, a driven shaft adjacent thereto, a concentric friction collar on each shaft mounted for rotation with its respective shaft, a concentric hollow substantially cylindrical casing member attached to the driving shaft and covering both said collars but spaced therefrom, a plurality of spaced clutch members extending longitudinally of said collars and each having a friction surface normally bearing against both said collars, said clutch members being located within said casing member and normally spaced therefrom, and a plurality of spring means releasable under a predetermined centrifugal force bearing on said clutch member and normally holding said clutch members in driving engagement with both said collars, one of said spring means being located opposite the driving shaft friction collar and another spring means being located opposite the driven shaft friction collar, said housing being provided with a plurality of inwardly directed substantially radial guide members extending into openings in said clutch members.

CHARLES H. SPARKLIN.

References Cited in the file of this patent

UNITED STATES PATENTS

| Number | Name | Date |
|---|---|---|
| 512,643 | Wilson | Jan. 9, 1894 |
| 704,575 | Pintsch | July 15, 1902 |
| 1,029,302 | Kindberg | June 11, 1912 |
| 1,044,307 | Volk | Nov. 12, 1912 |
| 1,847,882 | Loug | Mar. 1, 1932 |
| 1,955,304 | Libby | Apr. 17, 1934 |
| 1,955,309 | Packer | Apr. 17, 1934 |
| 2,364,980 | Jimerson | Dec. 12, 1944 |